United States Patent [19]

Malka et al.

[11] Patent Number: 4,859,923

[45] Date of Patent: Aug. 22, 1989

[54] MICROPROCESSOR CONTROLLED DUAL CHANNEL CLOSED LOOP CONTROLLER FOR STEPPER MOTORS USED IN SERVO SYSTEMS

[75] Inventors: Jacob H. Malka, Fair Lawn; Joseph T. Goodman, Hackensack, both of N.J.

[73] Assignee: Allied-Signal Inc., Morris Township, Morris County, N.J.

[21] Appl. No.: 218,767

[22] Filed: Jul. 14, 1988

[51] Int. Cl.⁴ ............................................. H02P 8/00
[52] U.S. Cl. .................................... 318/685; 318/696
[58] Field of Search ................................ 318/685, 686

[56] References Cited
U.S. PATENT DOCUMENTS 4,401,931  8/1983  Kulterman et al. ................. 318/696
4,422,040  12/1983  Raider et al. .................... 318/696 X
4,518,900  5/1985  Nawata ............................ 318/102

Primary Examiner—William M. Shoop, Jr.
Assistant Examiner—Saul M. Bergmann
Attorney, Agent, or Firm—Howard G. Massung

[57] ABSTRACT

A controller for stepper motors used in servo systems is implemented for being controlled by a microprocessor via appropriate input/output circuitry. Upon application of discrete commands, the controller produces stepper motor drive signals at a predetermined rate in predetermined drive sequences for driving one motor and for concurrently driving one of a plurality of motors. Closed loop positioning of the stepper motors using digital position feedback is achieved, as is simultaneous manual control of the stepper motors utilizing a slew stick.

10 Claims, 1 Drawing Sheet

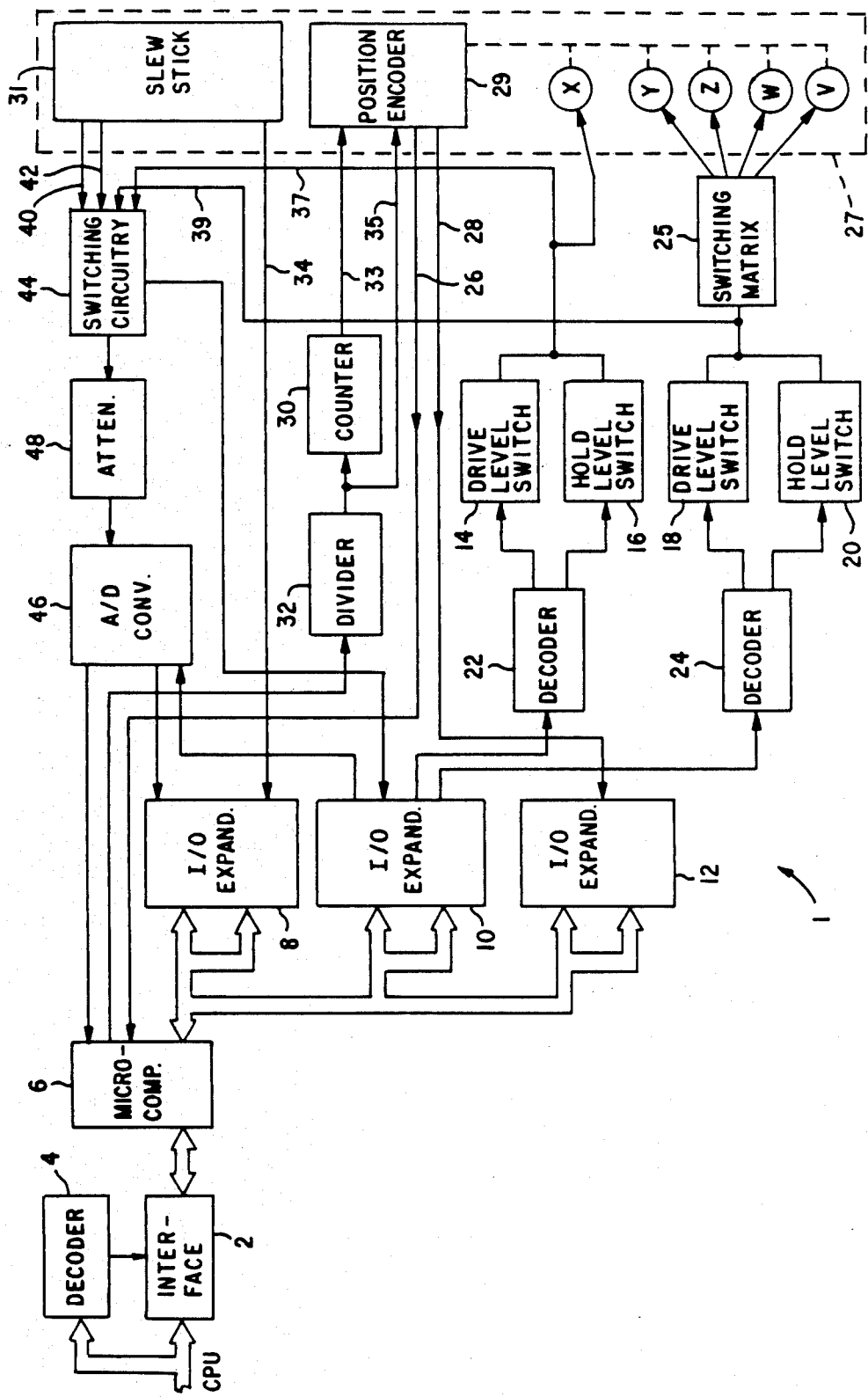

MICROPROCESSOR CONTROLLED DUAL CHANNEL CLOSED LOOP CONTROLLER FOR STEPPER MOTORS USED IN SERVO SYSTEMS

BACKGROUND OF THE INVENTION

Automatic test equipment such as, for example, that used for testing avionics systems, requires internally generated stimuli corresponding to particular parameters to be tested, and further requires that the generated stimuli be measured to determine their accuracy. Additionally, it is desirable that the test equipment have the capability of measuring externally generated signals corresponding to the particular parameters.

Servo systems using stepper motors such as chart visual indicator systems require test equipment with this capability. Additionally, the test equipment needs the capability to function as part of the servo system, wherein the stimuli generated by the test equipment is a function of some measurement of the externally generated signals.

Prior to the present invention, equipment of the type described has had the disadvantages of being somewhat cumbersome and inflexible, and required complicated circuitry dedicated to a particular servo system.

Accordingly, the main object of this invention is to overcome the aforenoted disadvantages by providing equipment including digital and analog components for closed loop control of stepper motors used in servo systems via computer interfacing, thereby allowing parameters such as motor speed and/or position to be specified by the computer.

Another object of the invention is to allow manual control of the stepper motors via a slew stick arrangement.

Yet another object of the invention is to achieve a desirable versatility in that a plurality of independently controlled simultaneously operated stepper motors can be accommodated.

SUMMARY OF THE INVENTION

This invention contemplates apparatus of the type described including dual channels each having a separate stepper motor position data input line. One of the channels has a dedicated output drive line, with the other channel having a time sharing capability with a set of output drive lines. Both channels are controlled by a single microcomputer which is used in conjunction with a central processing unit (CPU) as a dedicated controller for the stepper motors. The one channel drives a single stepper motor and the other channel concurrently drives one of a plurality of stepper motors. The arrangement is such that operating parameters such as motor position and/or speed may be changed with facility. The stepper motor controller and the CPU are arranged in a configuration whereby the CPU can be fully utilized. Serial and parallel digital position feedback signals are accommodated. Manual slew stick direction and deflection signals are also read as digital and analog DC levels.

BRIEF DESCRIPTION OF THE DRAWING

The single FIGURE in the drawing is a block diagram illustrating the invention.

DETAILED DESCRIPTION OF THE INVENTION

The stepper motor controller of the invention is designated by the numeral 1 and communicates with a main central processing unit (CPU), not otherwise shown, via a multibus interface 2. An address is decoded by a decoder 4 and applied to interface 2 for interfacing buffers and control logic included in the interface. Direct communication between a microcomputer 6 and the CPU is thus possible as will now be discerned. Microcomputer 6 interfaces with input/output circuitry included in controller 1 via input/output expanders 8, 10 and 12.

Two sets of drive circuitry are provided for concurrent control of two stepper motors. One set of drive circuitry includes a drive level switch 14 and a hold level switch 16 and the other set includes a drive level switch 18 and a hold level switch 20. The several switches 14, 16 and 18, 20 are enabled by line decoders 22 and 24, respectively, which are controlled by expander 10.

Switches 14 and 16 are dedicated to drive a stepper motor x and switches 18 and 20 are arranged in a time sharing arrangement via an externally controlled switching matrix 25 to drive one of the other stepper motors y, z, w or v, as the case may be. Motors x, y, z, w and v are included in a unit under test (UUT) 27, as is a position encoder 29 and a slew stick 31. The motors are mechanically coupled to position encoder 29. UUT 27 is a servo system of the type heretofore referred to which uses stepper motors X, Y, Z, W and V.

Each of the stepper motors is switched to an appropriate drive level by enabling respective drive level switches 14, 18 or to a hold level by enabling respective hold level switches 16, 20. With the switches disabled, the motors are pulled up to a predetermined voltage level through a suitable resistor (not otherwise shown).

The timing and sequence of the voltage levels applied to the motors is determined by microcomputer 6 for controlling motor speed and direction as will be further discussed.

Digital motor shaft position data is read by the CPU as serial data applied over serial data lines 26 to microcomputer 6 or as parallel data applied over parallel data lines 28 to the microcomputer via expander 12. Five separate serial data lines are provided to allow positioning of up to five motors x, y, z, w and v as aforenoted.

Timing signals for serial position encoders are provided by a counter 30 and applied over a timing line 33 to position encoder 29. The synchronous output of microcomputer 6 is applied to a divider 32. Divider 32 clocks counter 30 to provide serial position timing signals to encoder 29. The output of divider 32 applied over a synchronizing line 35 to position encoder 29 synchronizes the serial position timing signals with microcomputer instruction cycles to allow the microcomputer to read the serial data directly without external latching.

Parallel position data is read by expander 12. The arrangement is such that up to 16 bits of position data may be inputted to the system.

Manual or operator-operable slew stick control is implemented when an auto/manual mode logic input at a line 34 leading from slew stick 31 to expander 8 is at a logic "low". Microcomputer 6 sets up drive voltages to motor x and to one of the motors y, z, w and v, depending on the levels read at line 34 and at slew stick x axis manual rate line 40 and y axis manual rate line 42, with sequence timing being proportional to the DC voltage levels at lines 40 and 42. With the arrangement described motor X and one of the motors Y, Z, W and V are concurrently driven.

The x axis manual rate lines and the y axis manual rate lines are connected to switching circuitry 44. Under control of I/O expander 10, either of the lines 40, 42 can be switched to an analog to digital (A/D) converter 10 through an attenuator 48. The outputs from A/D converter 46 are read by expander 8. Signals at lines 34 for auto/manual selection, direction of slew stick deflection, and slew inhibiting are read by expander 8.

Drive lines 37 and 39 are wrapped around to switching circuitry 44. Under control of expander 10, each drive line is switchable to A/D converter 46 for a self test capability. A/D converter 46 is controlled by expander 10 and converter data lines are read by expander 8.

It will be understood that the several components of the invention are commercially available components and that the novelty of the invention resides in the arrangement of the components and not in the components themselves.

With the aforegoing description of the invention in mind reference is made to the claims appended hereto for a definition of the scope of the invention.

What is claimed is:

1. Apparatus of the type including a servo system and stepper motors used in the servo system, said apparatus comprising:
    a first channel including a first control line connected to a single stepper motor, and first drive means connected to the first control line and dedicated to driving said single motor;
    a second channel including a second control line, second drive means connected to the second control line and time sharing means connected to the second drive means and connected to a plurality of stepper motors, whereby said second drive means drives one of the plurality of motors in a time sharing arrangement with the other motors of the plurality of motors;
    processing means;
    interface means connected to the processing means; and
    controlling means connected to the interface means and to the first and second drive means, and communicating with the processing means for controlling the first and second drive means whereby the first drive means drives the single motor concurrently with the second drive means driving the one of the plurality of motors.

2. Apparatus as described by claim 1, wherein:
    the servo system includes position encoder means connected to each of the motors for providing digital signals corresponding to the positions of the motor shafts; and
    the controlling means includes means for feeding back the position signals to the processing means.

3. Apparatus as described by claim 2, wherein:
    the means for feeding back the position signals to the processing means includes means for feeding back serial position signals and means for feeding back parallel position signals.

4. Apparatus as described by claim 1, including:
    switching means;
    analog to digital converter means connected to the switching means;
    the controlling means connected to the analog to digital converter means;
    the first and second drive means connected to the switching means whereby analog signals from said first and second drive means are wrapped around to the switching means; and
    means controlled by the controlling means for operating the switching means, whereby the analog signals from the first and second drive means are applied to the analog to digital converter means and the digital signals therefrom are applied to the controlling means to provide a self test capability to the controller.

5. Apparatus as described by claim 2, wherein the position encoder means includes means for serial position encoding, said serial position encoding means including:
    divider means connected to the controlling means; and
    counter means connected to the divider means so as to be clocked thereby to provide timing signals, and connected to the position encoder means for applying the timing signals thereto so that said position encoder means accomplishes the serial position encoding.

6. Apparatus controller as described by claim 5, wherein:
    the divider means is connected to the position encoder means for synchronizing the timing signals applied thereto with controlling cycles of the controlling means.

7. Apparatus as described by claim 1, wherein each of the first and second drive means includes:
    means for providing a stepper motor drive level output; and
    means for providing a stepper motor hold level output.

8. Apparatus as described by claim 4, wherein:
    the servo system includes slew stick means which is operator-operable for providing a signal at a predetermined logic level, said slew stick means being connected to the controlling means for applying said signal thereto; and
    the controlling means being responsive to the applied signal for providing motor drive signals in a particular sequence commensurate with the analog signals from the first and second drive means applied to the controlling means through the analog to digital converter for slew stick control.

9. Apparatus as described by claim 8, wherein:
    the slew stick means is operator-operable for providing drive rate signals;
    the slew stick means is connected to the switching means for applying the drive rate signals thereto; and
    the analog to digital converter means receives the signals from the switching means, and the corresponding digital signals from the converter means are applied to the controlling means which reads said applied signals for providing the motor drive signals.

10. Apparatus as described by claim 9, wherein:
    the sequence timing of the motor drive signals provided by the controlling means being proportional to the levels of the drive rate signals.

* * * * *